US012682086B2

(12) United States Patent
Maciejewski et al.

(10) Patent No.: US 12,682,086 B2
(45) Date of Patent: Jul. 14, 2026

(54) ELECTRONIC ACCESS CONTROL SYSTEM

(71) Applicant: NOBLIS, INC., Reston, VA (US)

(72) Inventors: Erica Jean Maciejewski, Arlington, VA (US); Eric Gordon Epstein, Herndon, VA (US); Mark Jason Sanders, Reston, VA (US); Grace Kim, Reston, VA (US); Shane Dillon Mitchell, Reston, VA (US); Heather Meera Valore, Chantilly, VA (US)

(73) Assignee: NOBLIS, INC., Reston, VA (US)

( * ) Notice: Subject to any disclaimer, the term of this patent is extended or adjusted under 35 U.S.C. 154(b) by 54 days.

(21) Appl. No.: 18/680,087

(22) Filed: May 31, 2024

(65) Prior Publication Data

US 2024/0403454 A1 Dec. 5, 2024

Related U.S. Application Data

(60) Provisional application No. 63/505,782, filed on Jun. 2, 2023.

(51) Int. Cl.
H04L 29/06 (2006.01)
G06F 21/31 (2013.01)
G06F 21/60 (2013.01)

(52) U.S. Cl.
CPC ............. *G06F 21/604* (2013.01); *G06F 21/31* (2013.01); *G06F 2221/2113* (2013.01); *G06F 2221/2141* (2013.01)

(58) Field of Classification Search
CPC .................... G06F 21/604; G06F 21/31; G06F 2221/2113; G06F 2221/2141
See application file for complete search history.

(56) References Cited

U.S. PATENT DOCUMENTS

| | | | | |
|---|---|---|---|---|
| 9,807,094 | B1 * | 10/2017 | Liu | ......................... H04L 63/102 |
| 11,831,644 | B1 * | 11/2023 | Thakore | .............. G06F 16/2455 |
| 2019/0121350 | A1 * | 4/2019 | Cella | .................. G05B 19/4183 |

* cited by examiner

*Primary Examiner* — Evans Desrosiers
(74) *Attorney, Agent, or Firm* — Morrison & Foerster LLP

(57) ABSTRACT

A system for controlling access to an electronic resource can comprise a set of sensors and one or more processors. A first sensor in the set of sensors may detect first data indicating a characteristic of a user of the electronic resource. A second sensor in the set of sensors may detect second data indicating a characteristic of an environment of the electronic resource. The processors may use an ensemble of machine learning models to generate a score characterizing the user and characterizing the environment. The generated score may be evaluated based on one or more access criteria. Access to the electronic resource may be controlled based on the evaluation of the score.

25 Claims, 6 Drawing Sheets

300

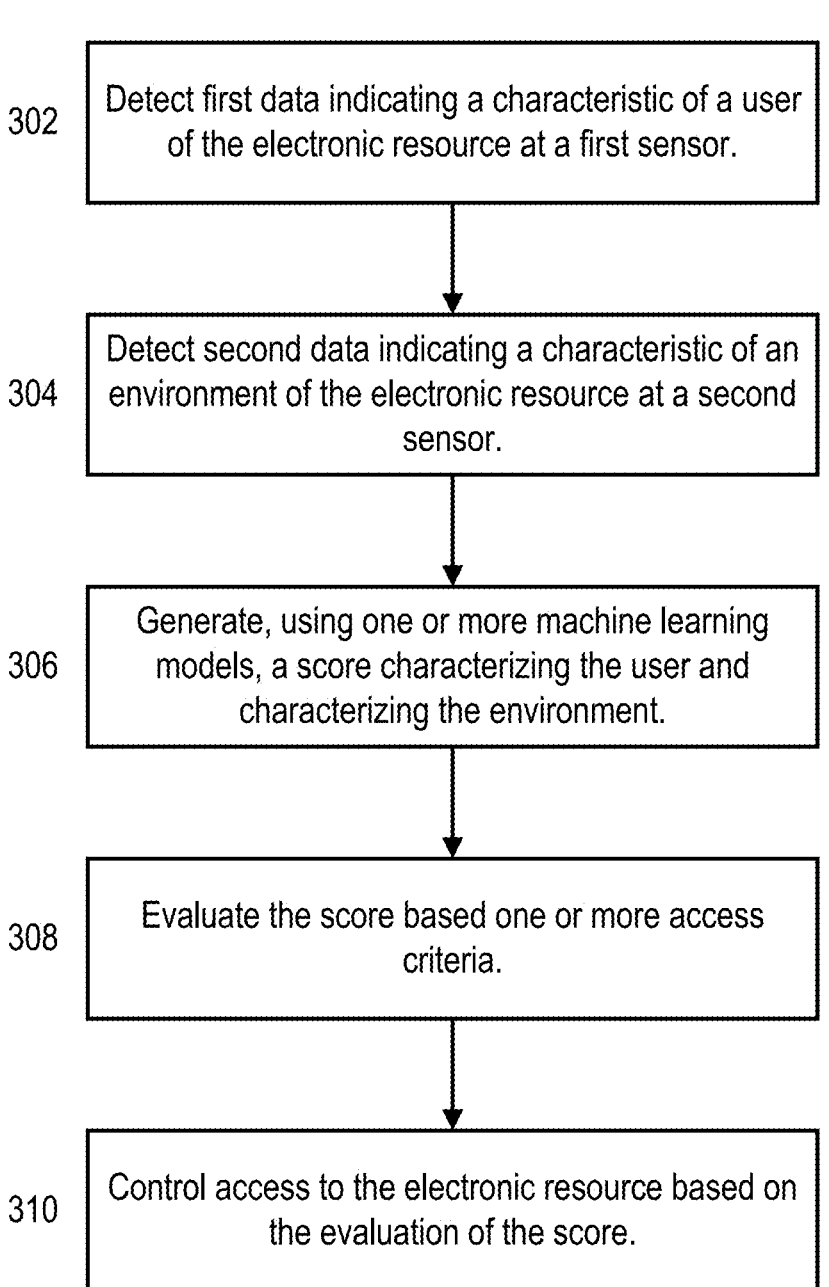

302 | Detect first data indicating a characteristic of a user of the electronic resource at a first sensor.

304 | Detect second data indicating a characteristic of an environment of the electronic resource at a second sensor.

306 | Generate, using one or more machine learning models, a score characterizing the user and characterizing the environment.

308 | Evaluate the score based one or more access criteria.

310 | Control access to the electronic resource based on the evaluation of the score.

FIG. 3

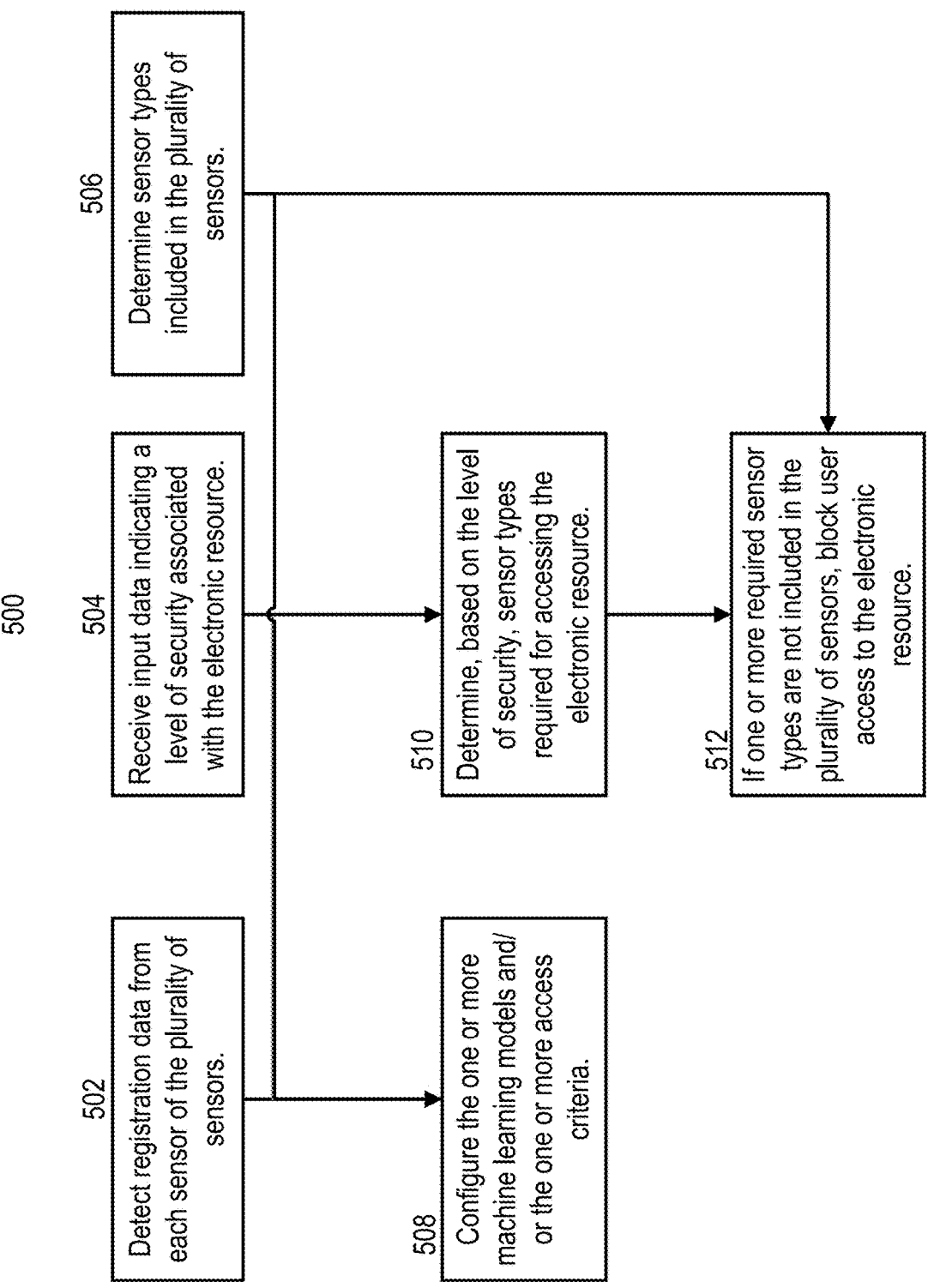

502 Detect registration data from each sensor of the plurality of sensors.

504 Receive input data indicating a level of security associated with the electronic resource.

506 Determine sensor types included in the plurality of sensors.

508 Configure the one or more machine learning models and/ or the one or more access criteria.

510 Determine, based on the level of security, sensor types required for accessing the electronic resource.

512 If one or more required sensor types are not included in the plurality of sensors, block user access to the electronic resource.

600

| 602 | Detect updates to the first data and/or the second data. |
| 604 | Generate, using one or more machine learning models, an updated score characterizing the user and characterizing the environment. |
| 606 | Evaluate the updated score based one or more access criteria. |
| 608 | Control access to the electronic resource based on the evaluation of the updated score. |

ELECTRONIC ACCESS CONTROL SYSTEM

CROSS-REFERENCE TO RELATED APPLICATIONS

This application claims the priority of U.S. Provisional Application No. 63/505,782, filed Jun. 2, 2023, the entire contents of which are incorporated herein by reference.

FIELD

The present disclosure relates to systems and methods for controlling user access to electronic resources, particularly electronic resources that store confidential or classified information.

BACKGROUND

Monitoring and controlling access to secure electronic resources is a requirement in various fields.

For example, when confidential or classified information is provided via electronic resources, controlling access to the electronic resources is important. Typically, access to electronic resources providing confidential or classified information is protected using password security, physical isolation and/or protection of said electronic resources, and/or manual human oversight of said electronic resources. For example, access to classified information may be secured by only providing access to said information via a Sensitive Compartmented Information Facility (SCIF).

Other use cases require monitoring and controlling access to secure electronic resources in order to ensure personal privacy. For example, sensitive financial and/or medical information provided via electronic resources may also be protected using password security, physical isolation and protection of said electronic resources, and/or manual human oversight of said electronic resources.

Still further, some use cases require monitoring and controlling access to secure electronic resources in order to ensure fairness and accuracy and to prevent fraud. For example, control over electronic financial systems may need to be monitored and controlled in order to prevent unauthorized access. In another example, access to electronic test-taking facilities may need to be monitored and controlled in order to prevent unauthorized access and/or to prevent unauthorized behaviors (e.g., cheating). In yet another example, access to electronic voting resources may need to be monitored and controlled in order to ensure the accuracy and integrity of voting systems. These electronic resources may also be protected using password security, physical isolation and protection of said electronic resources, and/or manual human oversight of said electronic resources.

SUMMARY

As explained above, access to secure electronic resources must be monitored and controlled to protect confidential and classified information, to preserve privacy, and to ensure security and integrity of data and processes. Typically, electronic resources are monitored and secured using password security, physical isolation and protection of said electronic resources, and/or manual human oversight of said electronic resources.

However, known techniques for monitoring and securing electronic resources have various shortcomings. For example, protection by password does not prevent access by unauthorized users who come into possession of a compromised (e.g., stolen, cracked, or impermissibly shared) password. Furthermore, protection of electronic resources by physical isolation and/or manual human oversight is expensive, labor intensive, and causes difficulty of access that reduces the efficiency of use of the protected electronic resources. The insufficiency of physical isolation and control as a sole or primary means for protecting sensitivity electronic information has only been further highlighted by the sharp increase in remote work in recent years; as more employees work from home and work on geographically dispersed teams, the need to protect sensitive electronic resources without relying on direct physical control (e.g., use of SCIFs, use of on-premises company computers) is greater than ever.

Accordingly, there is a need for systems and methods for monitoring and securing electronic resources without relying solely or primarily on password prevention, manual human oversight, or physical isolation/control of the electronic resources. Furthermore, there is a need for such systems and methods that monitor and secure electronic resources in a manner that is robustly protected against attempted unauthorized access including unauthorized access leveraging presentation attacks.

Accordingly, disclosed is a system for controlling access to an electronic resources. The described system may be attached to or implemented using components of the electronic resource so that access to the resource can be controlled regardless of the resource's location. The system may include various sensors for collecting information that may be relevant to the security of the electronic resource. Data collected by the sensors may be fed into a set of machine learning models, which may use the sensor data to characterize the current security level of the environment of the electronic resource, and to determine whether access should be granted or blocked based on the determined security level of the environment.

The sensors may collect data about the user attempting to access the electronic resource (e.g., biometric data indicative of an identity of the user and/or "liveness" data indicative of whether a presented user is in fact a live human being). The sensors may also collect about an environment (physical and/or virtual) in a vicinity of the user and the electronic resource. Such sensors may include biometric sensors (e.g., fingerprint scanners, iris scanners, etc.) configured to help authenticate the user's identity, visual monitoring systems (e.g., cameras) configured to collect visual information about the user and the physical environment around the electronic resource, and virtual monitoring systems (e.g., network monitors) configured to collect data about the virtual environment around the electronic resource. Leveraging machine learning may allow the system to efficiently evaluate data collected by the sensors, even when the data received from the sensors is highly varied or disparate. Different types of machine learning models, ranging from neural networks to image recognition models, may be employed to analyze the data and characterize the security level of the electronic resource.

After the current security level of the environment of the electronic resource has been characterized by the machine learning models, the system may evaluate the characterization and determine whether to grant the user access to the electronic resource. Access granted by the system may be full access or partial access. In some cases, when access is granted to a user, the system may periodically repeat the aforementioned security-level characterization and evaluation process in order to ensure that the electronic resource remains secure throughout its entire period of use. If, while the electronic resource is in use by the user, the system determines that the security level of the environment of the electronic resource is no longer sufficient, the system may cut off the user's access to the resource. The system may also provide information about attempts to access the electronic resource to the resource's owners (e.g., the user's employer) and may automatically notify the owners if potential security risks (e.g., attempted access by an unauthorized user) are detected.

In some embodiments, a system for controlling access to an electronic resource comprise a plurality of sensors and one or more processors. The one or more processors may be configured to cause the system to, at a first sensor of the plurality of sensors, detect first data indicating a characteristic of a user of the electronic resource. Additionally, the one or more processors may be configured to cause the system to, at a second sensor of the plurality of sensors, detect second data indicating a characteristic of an environment of the electronic resource. The one or more processors may be configured to cause the system to generate, using one or more machine learning models, based on the first data and the second data, a score characterizing the user and characterizing the environment, evaluate the score based on one or more access criteria, and control access to the electronic resource based on the evaluation of the score.

In some embodiments of the system, controlling access to the electronic resource comprises blocking the user from accessing the electronic resource if the score fails to satisfy the one or more access criteria.

In some embodiments of the system, controlling access to the electronic resource comprises blocking the user from accessing the one or more features of the electronic resource if the score partially satisfies the one or more access criteria.

In some embodiments of the system, controlling access to the electronic resource comprises granting the user access to the electronic resource if the score satisfies the one or more access criteria.

In some embodiments of the system, the one or more access criteria comprise criteria associated with an identity of the user, a geographical location of the environment, a privacy level of the environment, or a liveness of the user.

In some embodiments of the system, the score characterizing the user and characterizing the environment characterizes an identity of the user.

In some embodiments of the system, the score characterizing the user and characterizing the environment characterizes an activity level of the user.

In some embodiments of the system, the score characterizing the user and characterizing the environment characterizes a security level of the environment.

In some embodiments of the system, the security level of the environment comprises a security level of a spatial environment proximate to the electronic resource.

In some embodiments of the system, the security level of the spatial environment comprises a security level of an electromagnetic environment proximate to the electronic resource.

In some embodiments of the system, the security level of the spatial environment comprises a security level of one or more physical objects proximate to the electronic resource.

In some embodiments of the system, the security level of the environment comprises a security level of a network environment associated with system.

In some embodiments of the system, the one or more processors are configured to detect updates to the first and second data in real time, generate, upon detecting updates to the first and second data, using the one or more machine learning models, an updated score characterizing the user and characterizing the environment, evaluate the updated score based on the one or more access criteria, and update access of the user to the electronic resource based on the evaluation of the updated score.

In some embodiments of the system, the one or more processors are configured to cause the system to, before detecting the first data and before detecting the second data, detect first registration data from the first sensor and second registration data from the second sensor, and configure the one or more machine learning models and/or the one or more access criteria based on the first registration data and the second registration data.

In some embodiments of the system, the one or more processors are configured to cause the system to determine that one or more sensor types is not included in the system, and in accordance with determining that the one or more required sensor types are not included in the system, blocking access of the user to the electronic resource.

In some embodiments of the system, the one or more processors are configured to cause the system to receive input data indicating a level of security associated with the electronic resource, and determine, based on the level of security, that the one or more sensor types are required sensor types for accessing the electronic resource.

In some embodiments of the system, the one or more processors are configured to cause the system to receive input data indicating a level of security associated with the electronic resource, and configure the one or more machine learning models and/or the one or more access criteria based on the level of security.

In some embodiments of the system, the first sensor comprises a biometric sensor.

In some embodiments of the system, the first sensor comprises a camera.

In some embodiments of the system, the first sensor comprises a body-worn sensor worn by the user.

In some embodiments of the system, the second sensor comprises a camera.

In some embodiments of the system, the second sensor comprises an RF sensor.

In some embodiments of the system, the second sensor comprises an audio sensor.

In some embodiments of the system, the second sensor comprises a sensor configured to monitor a network.

In some embodiments, a method is provided for controlling access to an electronic resource, the method executed by a system comprising a plurality of sensors, one or more processors, and memory, the method comprising: at a first sensor of the plurality of sensors, detecting first data indicating a characteristic of a user of the electronic resource; at a second sensor of the plurality of sensors, detecting second data indicating a characteristic of an environment of the electronic resource; generating, using one or more machine learning models, based on the first data and the second data, a score characterizing the user and characterizing the environment; evaluating the score based on one or more access criteria; and controlling access to the electronic resource based on the evaluation of the score.

In some embodiments, a non-transitory computer-readable storage medium storing instructions for controlling access to an electronic resource is provided, the instructions comprising code that, when executed by one or more processors of a system comprising a plurality of sensors, causes the system to: at a first sensor of the plurality of sensors, detect first data indicating a characteristic of a user of the electronic resource; at a second sensor of the plurality of sensors, detect second data indicating a characteristic of an environment of the electronic resource; generate, using one or more machine learning models, based on the first data and the second data, a score characterizing the user and characterizing the environment; evaluate the score based on one or more access criteria; and control access to the electronic resource based on the evaluation of the score.

In some embodiments, all or part of any one or more of the embodiments described above may be combined in whole or in part with one another, and/or with all or part of any other embodiment or other disclosure herein.

BRIEF DESCRIPTION OF THE FIGURES

The following figures show various systems and methods for controlling access to an electronic resource. The systems and methods shown in the figures may have any one or more of the characteristics described herein.

FIG. 3 shows a method for controlling access to an electronic resource, according to some embodiments.

FIG. 5 shows a method for configuring a system for controlling access to an electronic resource, according to some embodiments.

DETAILED DESCRIPTION

Many employers have benefitted greatly from allowing employees to work remotely. For example, remote work options expand (or, in some cases, entirely remove) geographical restrictions on the employer's pool of job applicants, potentially providing employers access to qualified candidates that would have otherwise been missed. Remote work options may also increase employee productivity by ensuring employees can work even when they cannot be physically present in an office, for instance during work-related travel.

Despite the numerous advantages imparted by remote work options, some employers may be reluctant to permit employees to work remotely because doing so would require employees to remove electronic resources storing sensitive information from centralized office locations. There is need, therefore, for access control solutions for maintaining the security of electronic resources by ensuring said resources can only be accessed by authorized users under specified conditions.

Accordingly, described is an electronic resource access control system that can automatically analyze a current security level of—and, if necessary, block access to—an electronic resource whenever a user attempts to access the resource. The system may utilize a set of sensors to collect data related to the user's identity and to the environment in which the user is attempting to access the resource. A set of trained machine learning models may receive data collected by the sensors and may produce a numerical score that characterizes the current security level of the electronic resource. The system may compare the score produced by the machine learning models to a set of access criteria that define circumstances under which the electronic resource should be accessed. If the score fails to meet one or more of the access criteria, the system may (at least partially) block the user from accessing the resource.

Figure 1:
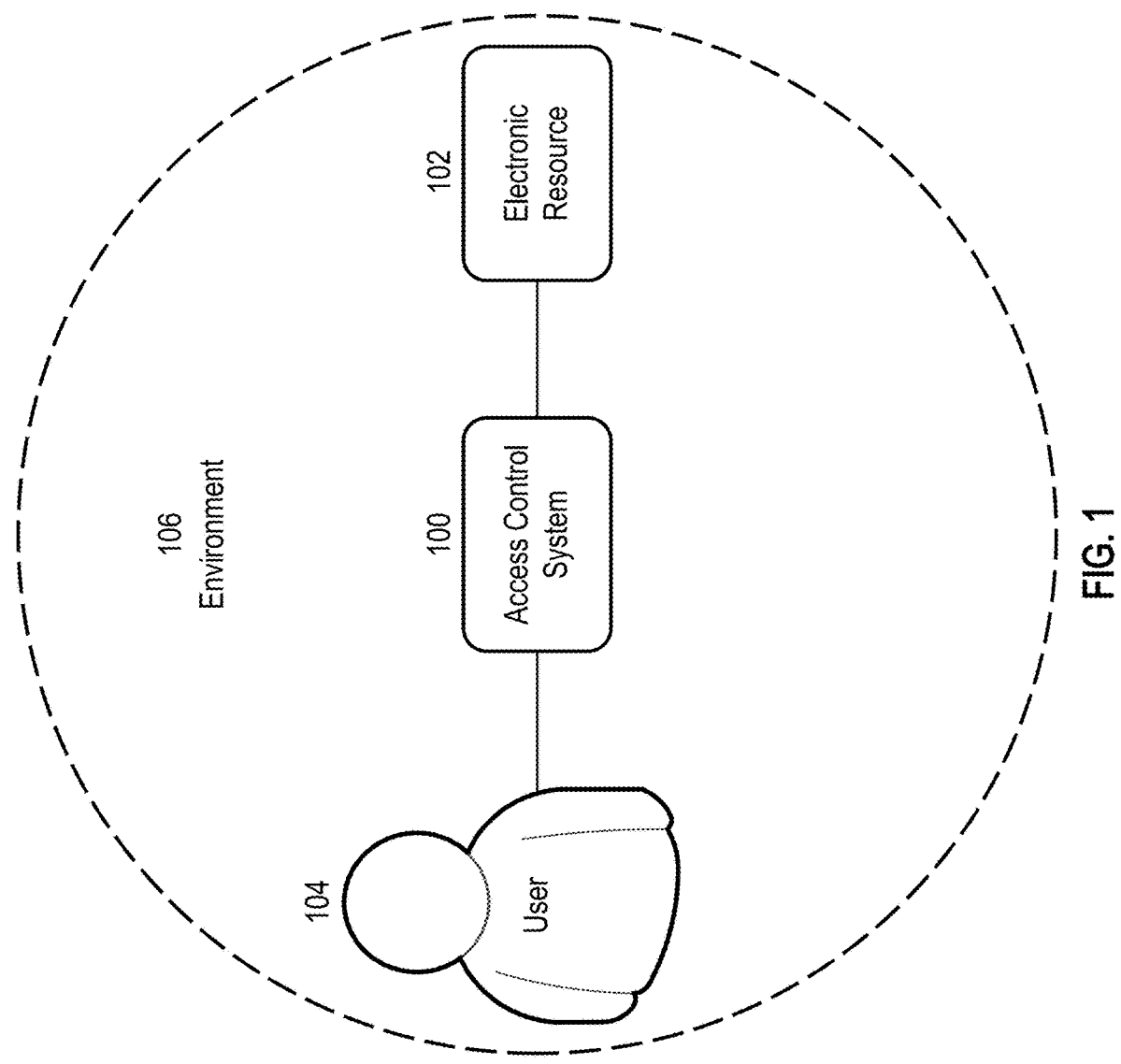
FIG. 1 shows a system for controlling access to an electronic resource, according to some embodiments.

FIG. 1 shows a diagram of an exemplary electronic resource access control system 100 relative to an electronic resource 102 and a user 104. Electronic resource 102 may be a device or a collection of devices that include a processing system and a memory system. For example, electronic resource 102 may be or may include a desktop computer, a laptop computer, a tablet computer, a mobile device, or a server. System 100 may be coupled to electronic resource 102 so that, in the event that electronic resource 102 is moved to a different location, system 100 is moved to that location, as well. This may ensure that any user (e.g., user 104) who attempts to access electronic resource 102 is first forced to interact with system 100, regardless of the location at which the attempt occurs.

System 100 may be configured to account for a variety of potential risks to the security of electronic resource 102 by collecting a range of data about both user 104 and an environment 106 around system 100, electronic resource 102, and/or user 104. Data collected by system 100 about user 104 may include biometric data (e.g., fingerprint data) that can be used to verify the identity of user 104. User data may also include behavioral or biological data (e.g., heart rate data) that can be used to monitor the actions of user 104, for example to detect suspicious behavior of user 104. Data collected by system 100 about environment 106 may include visual data or audio data about the physical surroundings of system 100, electronic resource 102, and user 104 (e.g., to determine whether user 104 is attempting to access electronic resource 102 in a private setting or a public setting), as well as data about the virtual environment associated with system 100, electronic resource 102, and user 104.

Environment 106 may be defined based on security level requirements for electronic resource 102 and may be configured to encompass system 100, electronic resource 102, and user 104. The boundaries of environment 106 may be delimited relative to a location of access control system 100. For example, environment 106 may be a spatial environment proximate to system 100 such as an area within a predetermined radius of system 100. The predetermined radius can, in some embodiments, be greater than or equal to about 0.5, 1, 2, 3, 4, 5, 6, 7, 8, 9, 10, 20, 30, 40, or 50 feet. In other embodiments, the predetermined radius can be less than or equal to about 100, 90, 80, 70, 60, 50, 40, 30, 20, 10, or 5 feet.

Figure 2:
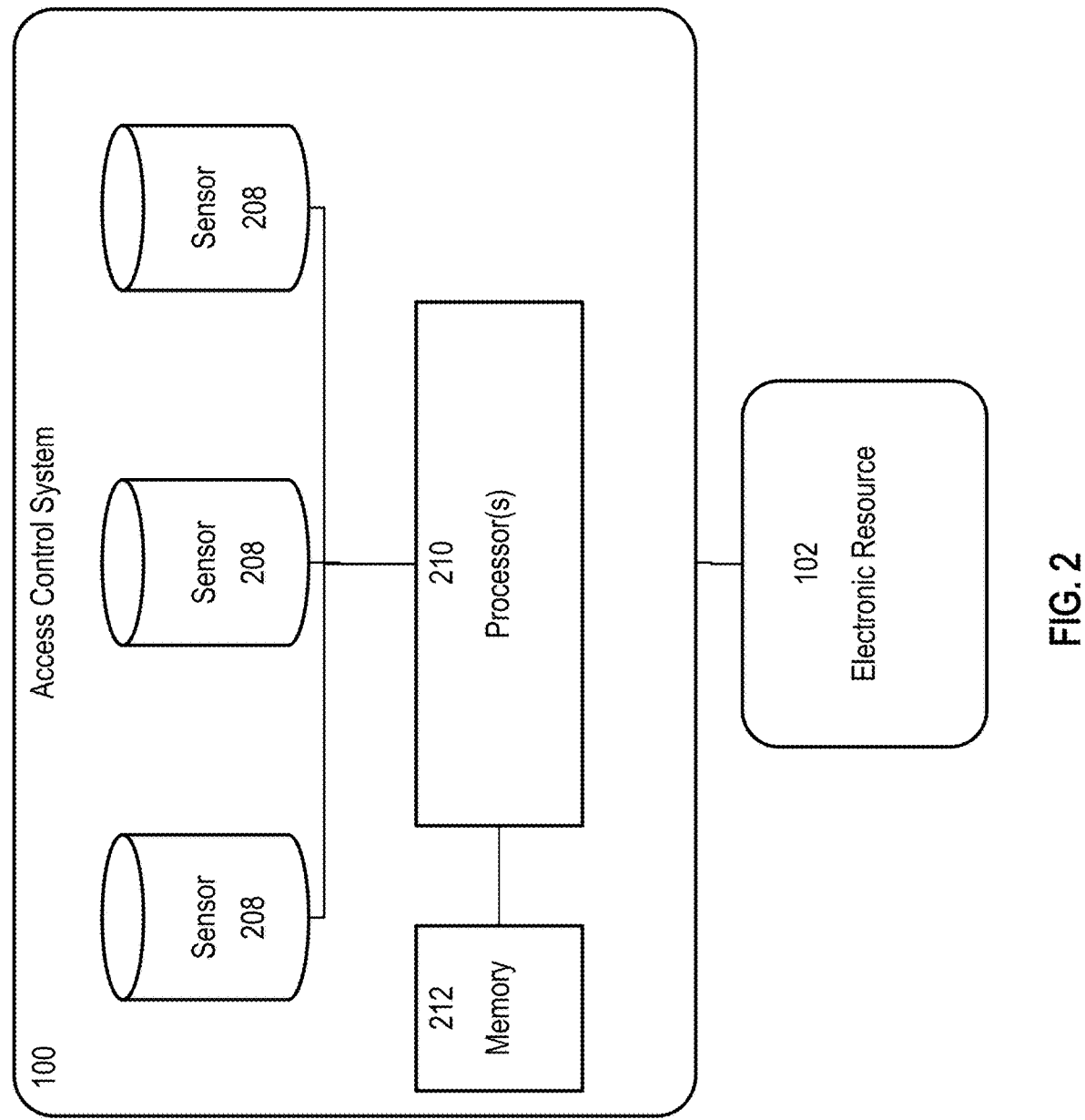
FIG. 2 shows components of a system for controlling access to an electronic resource, according to some embodiments.

A diagram of exemplary components of system 100 is provided in FIG. 2. As shown, system 100 may include a plurality of sensors 208 and one or more processors 210. Processors 210 may be coupled to and configured to receive data collected by sensors 208. Upon receipt of data from sensors 208, processors 210 may be configured to characterize a security level of electronic resource 102 and, based on the security level characterization, determine whether access to electronic resource 102 should be allowed or (at least partially) blocked.

As mentioned, system 100 may be configured to collect a range of data about the user (e.g., user 104) attempting to access electronic resource 102 and an environment (e.g., environment 106) around system 100, electronic resource 102, and/or user 104. Accordingly, sensors 208 may include sensors configured to measure or monitor properties of the user attempting to access electronic resource 102 as well as sensors configured to measure or monitor properties of the environment.

The number of sensors 208 included in system 100 may depend on specific properties and security level requirements of electronic resource 102. In some embodiments, system 100 can include at least 1, at least 2, at least 3, at least 4, at least 5, at least 10, at least 15, at least 20, or at least 25 sensors 208. In other embodiments, system 100 can include fewer than 50, fewer than 45, fewer than 40, fewer than 35, fewer than 30, fewer than 25, fewer than to, fewer than 15, or fewer than 10 sensors 208.

At least one sensor of the plurality of sensors 208 may be configured to collect data indicating one or more characteristics of a user attempting to access electronic resource 102. The characteristics may include biometric characteristics, physiological characteristics, visual characteristics, or audible characteristics of the user. A sensor (or sensors) configured to collect data indicating user characteristics may comprise one or more of the following:

Biometric sensor(s), for example a fingerprint scanner, a palm scanner, a facial recognition sensor, an ocular scanner (e.g., for scanning a user's iris and/or retina), and/or a voice recognition sensor;

Sensor(s) for monitoring or measuring user behaviors, for example a sensor configured to measure computer-mouse movement by the user, and/or a sensor configured to monitor the user's typing rhythm, a motion sensor for detecting when and how often the user moves, and/or a blink detector configured to monitor a user's blinking rate;

Physiological sensor(s), for example a heart rate monitor and/or a sensor configured to track a user's head or eye movement;

Visual sensor(s), for example a camera configured to record video of the user or to capture images of the user; and/or Audio sensor(s), for example a microphone configured to record audio of the user.

In some embodiments, one or more of the sensors configured to collect user characteristic data may be a body-worn sensor worn by the user.

System 100 may also include at least one sensor configured to collect data indicating one or more characteristics of the environment around system 100, electronic resource 102, and the user attempting to access electronic resource 102. Environmental characteristics may include characteristics of both the physical (i.e., spatial) environment and the virtual environment in a vicinity of system 100, electronic resource 102, and the user attempting to access electronic resource 102. A sensor (or sensors) configured to collect data indicating environmental characteristics may comprise one or more of the following:

Visual sensor(s), for example a camera configured to record video of the environment or capture images of the environment;

Audio sensor(s), for example a microphone configured to record audio of the environment and/or a sensor configured to detect an ambient noise level in the environment;

Electromagnetic sensor(s), including radio frequency (RF) or infrared (IR) sensors, for example an antenna, a coil, and/or a magnetometer;

Physical property sensor(s), including a thermometer, a moisture sensor, a light sensor, and/or an accelerometer;

Location detector(s), for example a GPS;

Sensor(s) configured to monitor virtual networks/network latency in the environment; and/or Device(s) configured to manage cryptographic protocols (e.g., specialized cryptographic protocols used by government systems) and to ensure proper data encryption.

System 100 may be physically coupled to or implement using one or more components of electronic resource 102. As such, system 100 one or more of the plurality of sensors 208 may be implemented using components of electronic resource 102. For example, if electronic resource 102 is a laptop computer, system 100 may be configured to utilize a camera or a microphone on the laptop as sensors for collecting user characteristic data or environmental characteristic data.

Processor(s) 210 may include any device or circuitry configured to perform operations on data. For example, processor(s) 210 may include one or more central processing units (CPUs), graphics processing unit (GPUs), audio processors, digital signal processors, and field-programmable gate arrays (FGPAs). In some embodiments, processor(s) 210 can include processors in electronic resource 102, for example a CPU in electronic resource 102.

In addition to sensors 208 and processor(s) 210, system 100 may comprise a memory 212. Memory 210 can include any device configured to provide storage, including electrical, magnetic, or optical memory, for instance a random-access memory (RAM), a cache, a hard drive, a CD-ROM drive, a tape drive, or a removable storage disk. In some embodiments, memory 210 can be a memory system included in electronic resource 102.

When a user attempts to access electronic resource 102, sensors 208 may automatically be triggered to collect data indicating characteristics about the user and the environment. Data collected by sensors 208 may be transmitted to processor(s) 210. Upon receipt of data from sensors 208, processor(s) 210 may be configured to execute software (e.g., software stored in memory 210) comprising programs or instructions for controlling access to electronic resource 102.

FIG. 3 shows an exemplary method 300 for controlling access to an electronic resource (e.g., electronic resource 102) using an electronic resource access control system such as system 100. When a user attempts to access an electronic resource—for instance, by booting up the electronic resource or attempting to log in to the electronic resource—the access control system may automatically detect, using a first sensor of a plurality of sensors in the system, first data indicating a characteristic of the user of the electronic resource (step 302). First data can include one or more of biometric data, physiological data, behavioral data, visual data, and audio data associated with the user. In addition to the first data, the access control system may automatically detect, using a second sensor of the plurality of sensors in the system, second data indicating a characteristic of an environment of the electronic resource (step 304). Second data can include one or more of visual data, audio data, electromagnetic data, physical property data, and virtual data associated with the environment. In some cases, steps 302 and 304 may be executed (approximately) simultaneously.

Once the first data and the second data are collected, the first data and the second data may be transmitted to the access control system's processors. The processors may use one or more machine learning models to generate a score characterizing the user and characterizing the environment based on the first data and the second data (step 306). The score may quantify a current state of the user and the environment relative to predetermined criteria. For example, the score may characterize the identity of the user, an activity level of the user, or a security level of the environment, including a security level of one or more physical objects in the environment or a security level of a network environment. In some embodiments, the score can include a single numerical value, for example a numerical value within a predetermined range (e.g., a number between 0-1.0, 1-5, 1-10, 1-100, etc.). Alternatively, the score may be a list of numerical values, each of which may characterize or be related to a specific feature of the user or the environment.

The machine learning (ML) model(s) employed to generate the score may vary depending on the type of data collected in steps 302-304. The ML models can include supervised learning models, unsupervised learning models, and semi-supervised learning models. Exemplary ML models or algorithms that may be used to generate the score include (but are not limited to) classification models (e.g., binary classification models, multiclass classification models, etc.), regression models, artificial neural networks such as feedforward neural networks (e.g. convolutional neural networks, multilayer perceptron, etc.), regulatory feedback networks, radial basis functions, recurrent neural networks, and memory networks (e.g., long short-term memory networks), decision trees, k-means algorithms, support vector machines, and natural language processors.

In some embodiments, an ensemble of ML models is used to generate the score. The ensemble may comprise a plurality of individual assessment models configured to assess a specific security aspect of the electronic resource based on data received from one or more of the sensors. For example, the ensemble may comprise a first individual assessment model configured to evaluate a user's blinking pattern based on data received from a camera and a second individual assessment model configured to detect cyber exfiltration attempts based on data received from a network traffic monitor. The ML methods used to develop each individual assessment model may depend on the type of data that the individual assessment model receives from the sensors (e.g., visual data, numerical data, etc.). Each individual assessment model may output an individual assessment score that characterizes the security of its respective security aspect. The individual scores may then be used to generate the score characterizing the user and characterizing the environment.

After the score characterizing the user and characterizing the environment is generated, the access control system may evaluate the score based on one or more access criteria (step 308). Access criteria may include criteria related to the user's identity, the location of the environment, a privacy level (including a virtual privacy level) of the environment, and the liveness of the user.

Evaluating the score may comprise comparing the score to one or more threshold values associated with the access criteria. The threshold value(s) may be set by a maintainer of the access control system and may depend on a range of values in which the score falls. For example, if the score is provided in a range between 0-100, a threshold value associated with an access criterion may be 89. If the score is less than 89, then the access control system may determine that the user and/or the environment of the electronic resource fail to meet (or, in other words, that the electronic resource is "insecure" relative to) said access criterion. On the other hand, if the score is greater than 89, then the access control system may determine that the user and/or the environment of the electronic resource meet (or, in other words, that the electronic resource is "secure" relative to) said access criterion. Based on the evaluation of the score with respect to all access criteria, the access control system may control the user's access to the electronic resource (step 310).

Figure 4:
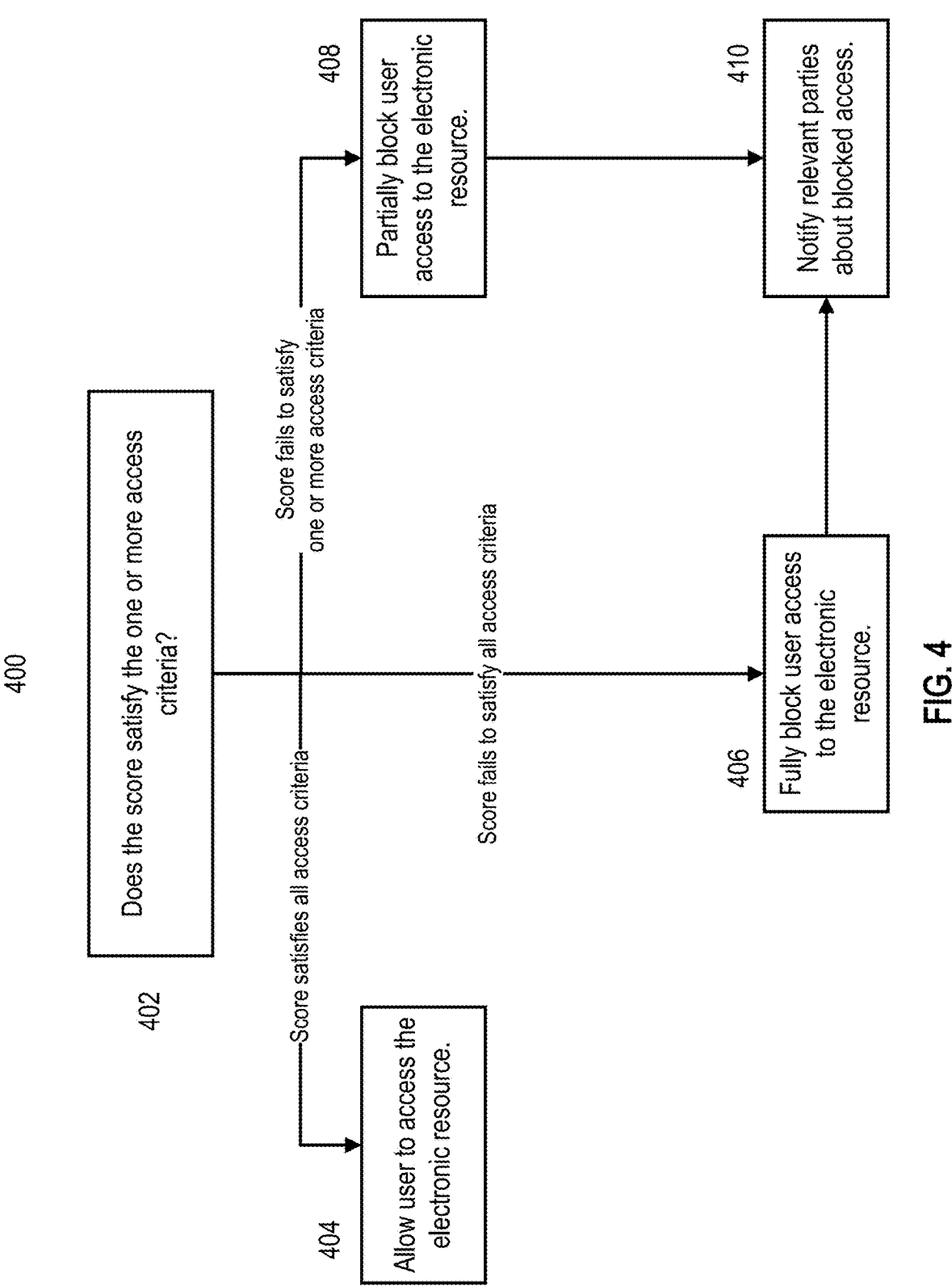
FIG. 4 shows a method for determining whether access to an electronic resource should be granted.

Method 400, shown in FIG. 4, provides exemplary steps that may be taken by an access control system based on the access control system's evaluation of a score characterizing a user of an electronic resource and an environment in a vicinity of the electronic resource. Method 400 may be executed by processors of an access control system (e.g., system 100), for example during steps 308-310 of method 300. As shown, the access control system may first determine whether the score satisfies one or more access criteria (step 402). If all access criteria are satisfied, the access control system may allow the user to access the electronic resource (step 404), for example by allowing the user to log in to the electronic resource. Alternatively, if no access criteria are satisfied, the access control system may block user access to the electronic resource (step 406), for example by locking the electronic resource to prevent the user from logging in.

In some embodiments, user access to the electronic resource may be fully blocked if the user fails to meet one or more access criteria, even if other access criteria are satisfied. In some embodiments, if the score partially satisfies the access criteria, the access control system may partially block user access to the electronic resource (step 408). Users granted partial access may only be permitted to access certain information or perform certain tasks using the electronic resource. For example, the user may be permitted to check their email but may not be permitted to access certain files.

If user access is fully or partially blocked, the access control system may be configured to notify one or more parties about the blocked access attempt (step 410). For example, if the access control system prevents a user from accessing the electronic resource, the access control system may notify an entity that owns the electronic resource of a possible security risk. Such notifications may help the entity quickly identify, assess, and address potential issues associated with the electronic resource.

As noted, different electronic resources may have different security level requirements. The security level requirements of an electronic resource may impact various features of the access control system. As such, an access control system may be configured to execute a registration process to characterize baseline user and environmental characteristics required for access to the electronic resource.

FIG. 5 shows an exemplary registration process 500. Registration process 500 may be executed prior to the initiation of a method for controlling access to the electronic resource (e.g., method 400 shown in FIG. 4). During registration process 500, the access control system may detect registration data from each sensor of the plurality of sensors in the access control system (step 502). Registration data may comprise information about a "normal" state of the user and/or the environment that provides the access control system with a baseline for comparison when access to the electronic resource is attempted. For example, registration data received from a fingerprint sensor may comprise an authorized user's fingerprints. When an individual attempts to access the electronic resource, the access control system may compare the individual's fingerprints to the authorized user's fingerprints received with the registration data in order to verify that the individual is the authorized user.

In addition to the registration data, the access control system may receive input data (e.g., user input data) indicating a level of security associated with the electronic resource (step 504). The access control system may also determine sensor types included in the plurality of sensors (step 506). Based on the registration data and the determined sensor types, the access control system may configure the machine learning models used to generate scores that characterize the user and characterizing the environment or the access criteria used to evaluate the generated scores (step 508). Based on the input data received in step 504, the access control system may determine, based on the indicated level of security, sensor types required for accessing the electronic resource (step 510). If one or more of the required sensor types are not included in the plurality of sensors, the access control system may automatically block access to the electronic resource until the appropriate sensor is provided.

Figure 6:
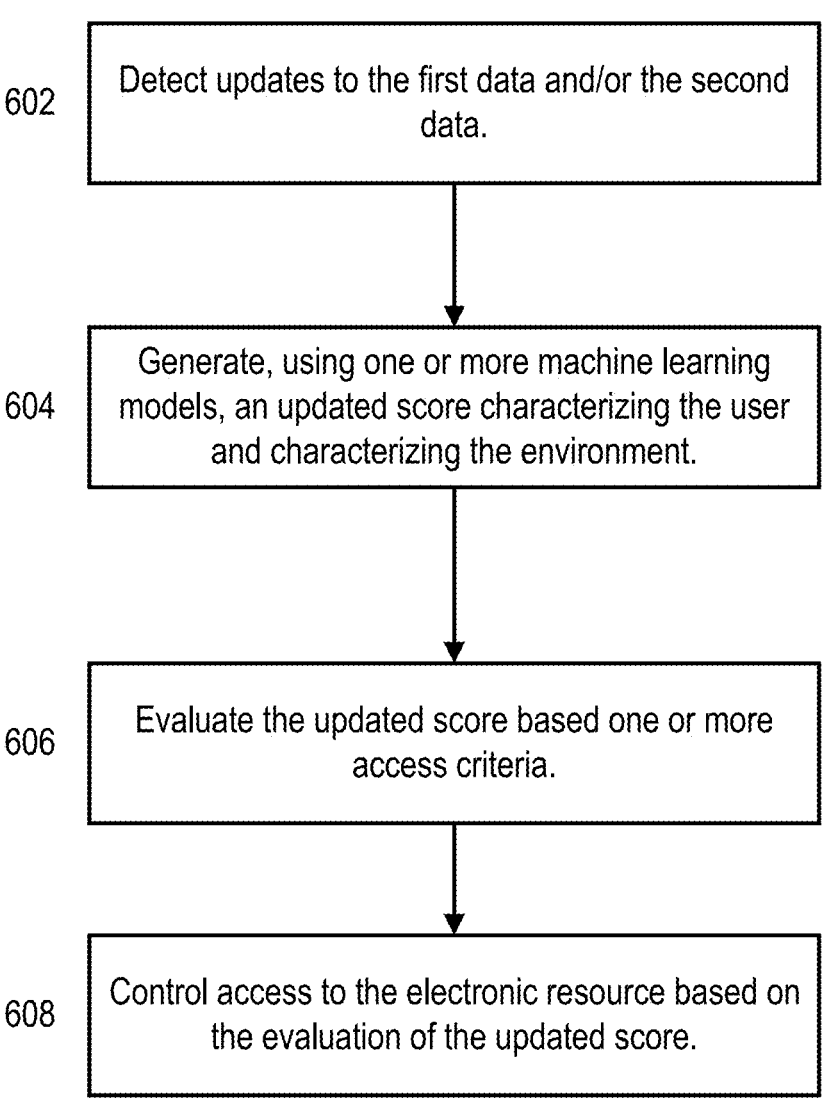
FIG. 6 shows a method for updating access to an electronic resource, according to some embodiments.

In some embodiments, characteristics of a user of an electronic resource or characteristics of an environment proximate to the electronic resource may change after the access control system has granted (or blocked) user access to the electronic resource. Accordingly, the access control system may be configured to periodically update the score that characterize the user and characterizing the environment whenever the electronic resource is in use or turned on. As shown in method 600 (FIG. 6), the access control system may detect updates to the first data indicating a characteristic of the user of the electronic resource and the second data indicating a characteristic of the environment of the electronic resource (step 602). The updates may be detected at a predetermined frequency (e.g., at least once every minute, every 2 minutes, every 5 minutes, every 10 minutes, etc.) or continuously (e.g., in real-time). An updated score characterizing the user and characterizing the environment may be generated using the one or more ML models whenever new data is detected (step 604). The access control system may evaluate the updated score based on the one or more access criteria (step 606) and control access to the electronic resource based on the evaluation of the updated score (608). Controlling access based on the updated score may, in some cases, result in the blocking of users who had previously been granted access (or vice versa).

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A system for controlling access to an electronic resource, the system comprising:
    a biometric sensor communicatively coupled to one or more hardware processors;

an environmental sensor communicatively coupled to the one or more hardware processors;
memory storing instructions that, when executed by the one or more hardware processors, cause the system to:
    at the biometric sensor, detect first data indicating a characteristic of a user of the electronic resource;
    at the environmental sensor, detect second data indicating a characteristic of an environment of the electronic resource;
    generate, using one or more machine learning models, based on the first data and the second data, a score characterizing the user and characterizing the environment;
    evaluate the score based on one or more access criteria; and
    control access to the electronic resource based on the evaluation of the score.

2. The system of claim 1, wherein controlling access to the electronic resource comprises blocking the user from accessing the electronic resource if the score fails to satisfy the one or more access criteria.

3. The system of claim 1, wherein controlling access to the electronic resource comprises blocking the user from accessing the one or more features of the electronic resource if the score partially satisfies the one or more access criteria.

4. The system of claim 1, wherein controlling access to the electronic resource comprises granting the user access to the electronic resource if the score satisfies the one or more access criteria.

5. The system of claim 1, wherein the one or more access criteria comprise criteria associated with an identity of the user, a geographical location of the environment, a privacy level of the environment, or a liveness of the user.

6. The system of claim 1, wherein the score characterizing the user and characterizing the environment characterizes an identity of the user.

7. The system of claim 1, wherein the score characterizing the user and characterizing the environment characterizes an activity level of the user.

8. The system of claim 1, wherein the score characterizing the user and characterizing the environment characterizes a security level of the environment.

9. The system of claim 8, wherein the security level of the environment comprises a security level of a spatial environment proximate to the electronic resource.

10. The system of claim 9, wherein the security level of the spatial environment comprises a security level of an electromagnetic environment proximate to the electronic resource.

11. The system of claim 9, wherein the security level of the spatial environment comprises a security level of one or more physical objects proximate to the electronic resource.

12. The system of claim 8, wherein the security level of the environment comprises a security level of a network environment associated with system.

13. The system of claim 1, wherein the instructions cause the system to:
    detect updates to the first and second data in real time;
    generate, upon detecting updates to the first and second data, using the one or more machine learning models, an updated score characterizing the user and characterizing the environment;
    evaluate the updated score based on the one or more access criteria;
    update access of the user to the electronic resource based on the evaluation of the updated score.

14. The system of claim 1, wherein the instructions cause the system to, before detecting the first data and before detecting the second data:

detect first registration data from the biometric sensor and second registration data from the environmental sensor; and configure the one or more machine learning models and/or the one or more access criteria based on the first registration data and the second registration data.

15. The system of claim 1, wherein the instructions cause the system to:

determine that one or more sensor types is not included in the system; and in accordance with determining that the one or more sensor types are not included in the system, blocking access of the user to the electronic resource.

16. The system of claim 15, wherein the instructions cause the system to:

receive input data indicating a level of security associated with the electronic resource; and determine, based on the level of security, that the one or more sensor types are required sensor types for accessing the electronic resource.

17. The system of claim 1, wherein the instructions cause the system to:

receive input data indicating a level of security associated with the electronic resource; and configure the one or more machine learning models and/or the one or more access criteria based on the level of security.

18. The system of claim 1, wherein the biometric sensor comprises a camera.

19. The system of claim 1, wherein the biometric sensor comprises a body-worn sensor worn by the user.

20. The system of claim 1, wherein the environmental sensor comprises a camera.

21. The system of claim 1, wherein the environmental sensor comprises an RF sensor.

22. The system of claim 1, wherein the environmental sensor comprises an audio sensor.

23. The system of claim 1, wherein the environmental sensor comprises a sensor configured to monitor a network.

24. A method for controlling access to an electronic resource, the method executed by a system comprising a biometric sensor, an environmental sensor, one or more hardware processors, and memory, the method comprising:

at the biometric sensor, detecting first data indicating a characteristic of a user of the electronic resource;

at the environmental sensor, detecting second data indicating a characteristic of an environment of the electronic resource;

generating, using one or more machine learning models, based on the first data and the second data, a score characterizing the user and characterizing the environment;

evaluating the score based on one or more access criteria; and controlling access to the electronic resource based on the evaluation of the score.

25. A non-transitory computer-readable storage medium storing instructions for controlling access to an electronic resource, the instructions comprising code that, when executed by one or more hardware processors of a system comprising a biometric sensor and an environmental sensor, causes the system to:

at the biometric sensor, detect first data indicating a characteristic of a user of the electronic resource;

at the environmental sensor, detect second data indicating a characteristic of an environment of the electronic resource;

generate, using one or more machine learning models, based on the first data and the second data, a score characterizing the user and characterizing the environment;

evaluate the score based on one or more access criteria; and control access to the electronic resource based on the evaluation of the score.

\* \* \* \* \*